United States Patent Office 3,226,391
Patented Dec. 28, 1965

3,226,391
RING E SUBSTITUTED YOHIMBANES
Jay D. Albright, Nanuet, Lester A. Mitscher, Spring Valley, and Leon Goldman, Nanuet, N.Y., assignors to American Cyanamid Company, New York, N.Y., a corporation of Maine
No Drawing. Filed Mar. 27, 1961, Ser. No. 98,312
6 Claims. (Cl. 260—287)

This invention relates to new organic compounds and more particularly is concerned with new derivatives of yohimbe alkaloids which may be represented by the following general formula:

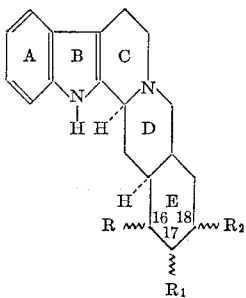

in which R is hydrogen, keto or lower alkoxyoxalyl, $R_1$ is keto, carboxyl, lower alkoxycarbonyl or lower alkoxyoxalyl, and $R_2$ is hydrogen, carboxyl, lower alkoxycarbonyl or lower alkoxyoxalyl, with the proviso that one substituent only is keto and one substituent only is hydrogen. Suitable lower alkyl groups contemplated by the present invention are those having from one to six carbon atoms with methyl and ethyl being preferred.

The invention also embraces the useful nontoxic pharmaceutically acceptable metal enolate and acid addition salts of these new derivatives. Typical metal enolate salts are the sodium salts and typical acid addition salts are the hydrochlorides, hydrobromides, sulfates, etc.

The new compounds of this invention are, in general, white to tan crystalline solids, the free bases of which are soluble in organic solvents such as alcohols, chloroform, dimethylformamide, dioxane, pyridine and the like, and the salts of which are soluble in polar solvents such as water and alcohols.

The novel compounds are valuable central nervous system depressants of low toxicity and may be administered orally or parenterally. When so administered they have been found to exhibit tranquilizing action similar to reserpine in amounts ranging from about 25 to 350 milligrams per kilogram of body weight. The new compounds are also useful as diuretics and hypotensives in oral doses of about the same order of magnitude.

The new compounds of this invention may be prepared from the corresponding yohimbanones and alloyohimbanones which are known to the prior art. Yohimban-17-one has been described by B. Witkop [Ann., 554, 83 (1943)]; alloyohimban-17-one by A. Le Hir, M. M. Janot and R. Goutarel [Bull. Soc. Chim., 10, 27 (1953)]; and yohimban-16-one by R. K. Hill and K. Muench [J. Org. Chem., 22, 1276 (1957)] and E. Wenkert, E. W. Rabb and N. V. Bringi [J. Am. Chem. Soc., 79, 6570 (1957)].

The new compounds may be prepared by the following reactions which also form a part of the present invention.

(I) Yohimban-17-one is reacted with a lower alkyl metal carbonate such as methyl magnesium carbonate to yield the corresponding 18α-carboxylic acid. Alternately, alloyohimban-17-one is carboxylated with a lower alkyl metal carbonate to yield the corresponding 16β-carboxylic acid.

(II) The so-prepared 16β- and 18α-carboxylic acids may then be esterified by conventional methods such as by treatment with a diazoalkane, for example, diazomethane, or treatment with an alcohol such as methanol and ethanol and a mineral acid or treatment with an alcohol in the presence of N,N'-dicyclohexylcarbodiimide.

(III) Alternatively, an alkali metal salt of yohimban-17-one, alloyohimban-17-one or yohimban-16-one may be alkoxyoxalylated by treatment with an appropriate alkyl ester of oxalic acid such as ethyl oxalate.

The foregoing reactions are illustrated schematically below:

(1)

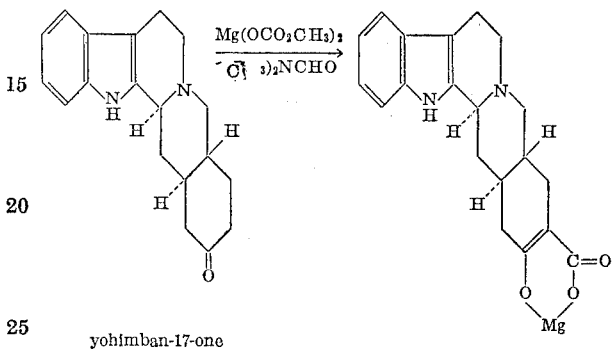

yohimban-17-one

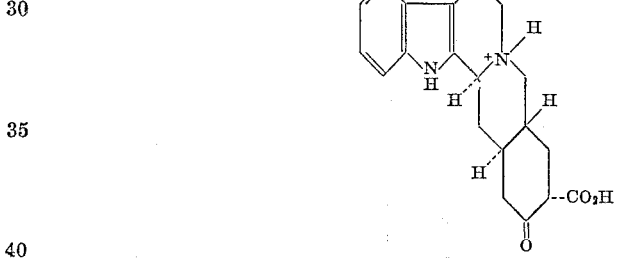

17-oxoyohimban-18α-carboxylic acid

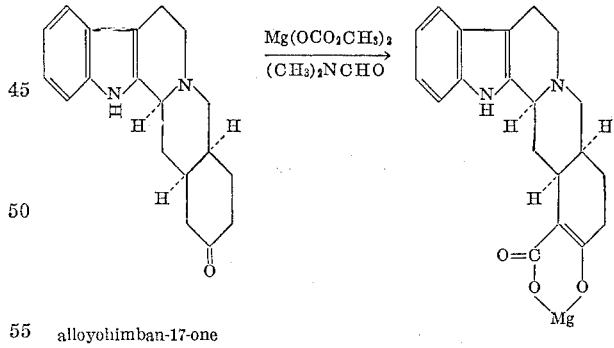

alloyohimban-17-one

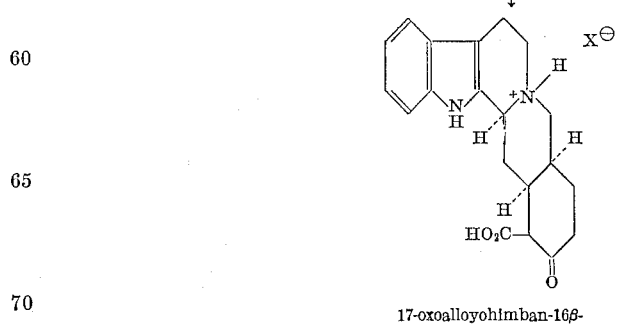

17-oxoalloyohimban-16β-carboxylic acid (II)

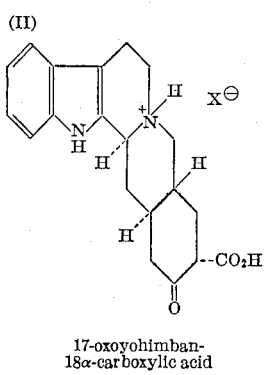

17-oxoyohimban-
18α-carboxylic acid

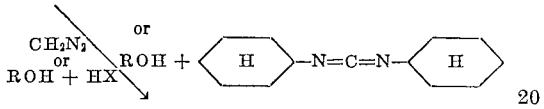

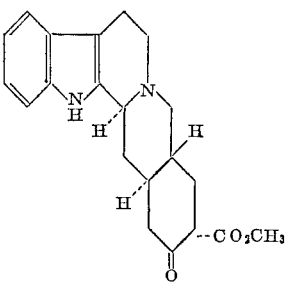

methyl 17-oxoyohimban-
18α-carboxylate

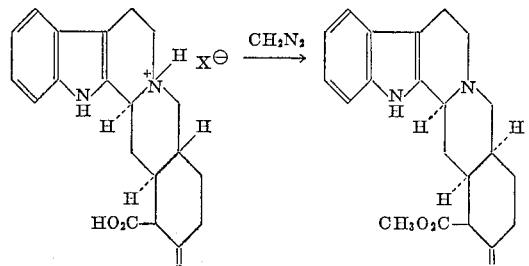

17-oxoalloyohimban-16β-      methyl 17-oxoalloyo-
carboxylic acid              himban-16β-carboxylate (III)

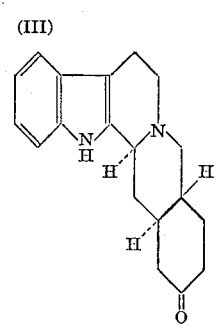

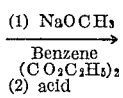

yohimban-17-one

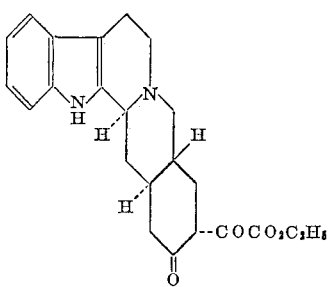

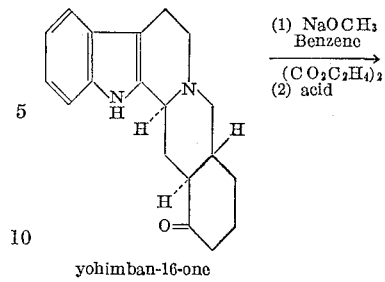

yohimban-16-one alloyohimban-17-one

With respect to Reaction I, treatment of yohimban-17-one or alloyohimban-17-one with a lower alkyl metal carbonate is ordinarily carried out in a polar, non-acidic solvent such as dimethylformamide, dimethylsulfoxide, tetrahydrofuran, dioxane and the like, or mixtures thereof, in an inert atmosphere such as nitrogen. The temperature of the reaction may range from 30–200° C. and preferably 90–130° C. The duration of the reaction may be 1–10 hours, more or less. The intermediate product of this reaction is a metal enolate which is converted into the desired keto 16β- or 18α-carboxylic acid addition salt by pouring the reaction mixture into a mixture of ice and a suitable mineral acid such as sulfuric acid or hydrochloric acid. The product precipitates as a salt, which is filtered and then purified by conventional methods such as recrystallization from alcohol.

With respect to Reaction II, the esterification of the 16β- or 18α-carboxylic acid is carried out by conventional procedures as indicated above.

With respect to Reaction III, the alkoxyoxalylation is ordinarily carried out in a solvent such as benzene, toluene, ether, xylene, tetrahydrofuran, dimethylformamide, dioxane, diethyleneglycol dimethyl ether and methanol. Ordinarily the appropriate yohimbanone or alloyohimbanone is suspended in the solvent and an alkali metal alkoxide is added, after which the oxalic acid ester is added. The reaction is carried out at a temperature ranging from 0–50° C., conveniently, room temperature, and for a period of time ranging from an hour or so to several days.

The new compounds may be used as such but more preferably are used in the form of their non-toxic acid addition salts which may be readily prepared by treatment with one equivalent of an acid such as hydrochloric, sulfuric, phosphoric, citric, etc. As indicated earlier, the metal enolate salt may be easily prepared by the use of one equivalent of a metal hydroxide, carbonate, bicarbonate, etc.

The invention will be described in greater detail in conjunction with the following specific examples.

*Example 1.—Preparation of 17-oxoyohimban-18α-carboxylic acid hydrochloride*

A mixture of 2.0 grams of yohimban-17-one and 25 milliliters of a solution (about 2 M) of methyl magnesium carbonate in dimethylformamide was stirred and heated at 120–130° C. for 3 hours under nitrogen. The mixture was cooled in an ice bath and added slowly to a stirred mixture of 50 grams of ice and 30 milliliters of concentrated hydrochloric acid, which was cooled in an ice-salt bath. The solid which separated was filtered and washed with 2 milliliters of cold 6 N hydrochloric acid. Drying over phosphorous pentoxide under vacuum at room temperature afforded 2.71 grams of tan crystals, M.P. 292–294° C. dec. (when inserted in an oil bath preheated to 288° C.). A 1.91 gram portion of this solid was triturated with a mixture of 650 milliliters of methanol and 600 milliliters of ether and the suspension was filtered to yield 0.860 gram of 17-oxoyohimban-18α-carboxylic acid hydrochloride as white crystals, M.P. 314–317° C. dec. (when inserted in an oil bath preheated to 310° C.).

*Example 2.—Preparation of 17-oxoyohimban-18α-carboxylic acid sulfate*

Yohimban-17-one (0.294 gram) was carboxylated with 4.0 milliliters of a solution of methyl magnesium carbonate in dimethylformamide as described in Example 1. The cooled reaction mixture was added to a mixture of 12 grams of ice and 2 milliliters of 98% sulfuric acid and the solid which separated was filtered and washed with water and 1 milliliter of ethnol. Drying over phosphorous pentoxide under vacuum at room temperature for several hours afforded 0.364 gram of 17-oxoyohimban-18α-carboxylic acid sulfate as pale yellow crystals, M.P. 230–260° C. (gas evolution at 260° C.).

*Example 3.—Preparation of methyl 17-oxoyohimban-18α-carboxylate*

To a suspension of 0.500 gram of 17-oxoyohimban-18α-carboxylic acid hydrochloride in 50 milliliters of ice cold methanol was added 50 milliliters of ice cold ether containing diazomethane (prepared from 4.0 grams of nitrosomethylurea and 8.0 milliliters of 40% potassium hydroxide and dried over potassium hydroxide pellets). The mixture was allowed to stand at room temperature for 10 minutes and the excess diazomethane was decomposed by the dropwise addition of glacial acetic acid. The solvent was removed under vacuum to give 0.598 gram of a hygroscopic glass. The glass was dissolved in 15 milliliters of boiling methanol and water was added dropwise until white crystals separated. Cooling and filtration gave 0.201 gram of methyl 17-oxoyohimban-18α-carboxylate as white crystals, M.P. 186–188° C. dec. (when inserted in an oil bath preheated to 180° C.). A second crop of crystals (0.0234 gram) was obtained by diluting the filtrate with water. Extraction of the filtrate with five 10-milliliter portions of chloroform and evaporation of the extracts under vacuum gave a glass. This glass was dissolved in 2.0 milliliters of methanol and the solution diluted with 1.0 milliliter of water. Cooling and filtration afforded a third crop (0.102 gram) of crystals, M.P. 181–183° C. dec. (when inserted in an oil bath preheated to 180° C.). The three crops were combined, dissolved in 45 milliliters of methanol and the solution diluted with 3.0 milliliters of water. Cooling and filtration gave 0.211 gram of methyl 17-oxoyohimban-18α-carboxylate as white crystals, M.P. 186–188° C. dec. (when inserted in an oil bath preheated to 180° C.), $[\alpha]_D^{25}$ −157° (c. 1.00, methanol); −176° (c. 1.10, chloroform).

*Example 4.—Preparation of methyl 17-oxoyohimban-18α-carboxylate*

A mixture of 0.350 gram of 17-oxoyohimban-18α-carboxylic acid hydrochloride, 40 milliliters of methanol and 10 milliliters of methanol saturated with dry hydrogen chloride was refluxed for 4 hours. The solution was concentrated under vacuum to approximately 5 milliliters and the residual solution was diluted with ether. Cooling and filtration gave 0.223 gram of white crystals which were washed with ether. A portion of the crystals (0.100 gram) was partitioned between 10 milliliters of saturated sodium bicarbonate solution and 10 milliliters of chloroform. The aqueous layer was extracted with an additional 10 milliliters of chloroform. Evaporation of the combined chloroform extracts under vacuum gave 0.098 gram of a glass which was dissolved in 5 milliliters of hot methanol and the solution diluted with water until crystals separated. Cooling and filtration gave 0.073 gram of white needles (darkens and partially melts at 184° C., completely melts at 248–255° C., dec. (when inserted in an oil bath preheated to 180° C.)). This solid was identified as a mixture of yohimban-17-one and methyl 17-oxoyohimban-18α-carboxylate by infrared analysis. This mixture was separated into its components by chromatography on silica gel.

*Example 5.—Preparation of methyl 17-oxoyohimban-18α-carboxylate*

To an ice cold mixture of 10.0 grams of crude 17-oxoyohimban-18α-carboxylic acid hydrochloride and 100 milliliters of dimethylformamide were added 100 milliliters of methanol and 11.0 grams of N,N'-dicyclohexylcarbodiimide. The mixture was stirred at room temperature for 20 hours, treated with 10 milliliters of water and 3 milliliters of acetic acid and stirred for an additional hour. The precipitated solid was removed by filtration and the filtrate concentrated under vacuum to 100 milliliters. The residual solution was treated with 50 milliliters of saturated sodium bicarbonate solution and extracted with four 50-milliliter portions of chloroform. The extracts were washed with three 100-milliliter portions of water, dried over sodium sulfate and concentrated under vacuum. The residue was warmed with 50% aqueous methanol and on cooling and filtering there was obtained 6.0 grams of methyl 17-oxoyohimban-18α-carboxylate contaminated with some yohimban-17-one and N,N'-dicyclohexylurea. Separation of the components was accomplished by chromatography over silica gel and recrystallization from aqueous methanol.

*Example 6.—Preparation of ethyl 17-oxoyohimban-18α-glyoxylate*

A mixture of 5.00 grams of yohimban-17-one, 1.00 gram of sodium methoxide and 17.0 milliliters of freshly distilled ethyl oxalate in 250 milliliters of dry benzene was stirred at room temperature for 20 hours. The dark brown-red suspension was diluted with 500 milliliters of cold, dry ether and filtered. The residue was treated with 150 milliliters of cold water and a few drops of 10 N sodium hydroxide (pH about 9) and the nearly clear suspension was rapidly extracted with two 100-milliliter portions of ethyl acetate. The alkaline aqueous phase was separated and neutralized with dilute acetic acid. A voluminous precipitate formed and was filtered and dried at room temperature under high vacuum to yield 3.41 grams of ethyl 17-oxoyohimban-18α-glyoxylate. The compound gave a purple-brown color with an alcoholic solution of ferric chloride. The crude product was crystallized from methanol to give yellowish-brown crystals, M.P. 215–216° C. dec., $\lambda_{max.}^{CH_3OH}$ 221 mμ (ε37,000), 283 mμ (ε11,600), 290 mμ (ε12,600), and 312 mμ (ε12,200).

*Example 7.—Preparation of ethyl 61-oxoyohimban-17β-glyoxylate*

A mixture of 0.589 gram of yohimban-16-one, 0.118 gram of sodium methoxide and 2.0 milliliters of ethyl oxalate in 40 milliliters of dry benzene was stirred under nitrogen at room temperature for 20 hours. The mixture was treated with 5 drops of glacial acetic acid, poured into 75 milliliters of ether, and filtered. The filtrate was washed with two 25-milliliter portions of water, dried over sodium sulfate and the solvent removed under vacuum. The residue was dissolved in 15 milliliters of hot ethanol, the solution was chilled and filtered, and the filtrate was diluted with 10 milliliters of water and chilled. Filtration afforded 0.205 gram of a tan powder, M.P. 193–196° C. dec. (when inserted in a bath preheated to 180° C.). The powder was dissolved in 4.0 milliliters of hot ethanol, treated with activated charcoal, filtered and chilled. The mixture was filtered from a small amount of orange solid and the filtrate diluted with 15 milliliters of water. Chilling and filtering afforded 0.107 gram of ethyl 16-oxoyohimban-17β-glyoxylate as a tan powder, M.P. 192–195° C. dec. (when inserted in an oil bath preheated to 180° C.);

$\lambda_{max}^{CH_3OH}$ 225 m$\mu$ ($\epsilon$34,000), 285 m$\mu$ ($\epsilon$15,320), 291 m$\mu$ ($\epsilon$16,650); $\lambda_{max}^{base}$ 225 m$\mu$ ($\epsilon$37,500), 283 m$\mu$ ($\epsilon$9,100), 291 m$\mu$ ($\epsilon$9,570), 322 m$\mu$ (broad) ($\epsilon$14,200).

*Example 8.—Preparation of ethyl 71-oxoalloyohimban-16β-glyoxylate*

A mixture of 2.22 grams of alloyohimban-17-one, 0.444 gram of sodium methoxide, and 7.5 milliliters of freshly distilled ethyl oxalate in 150 milliliters of dry benzene was stirred at room temperature for 24 hours. The brown-orange solution was added slowly to 1 liter of well stirred ether and chilled. The orange precipitate of the sodium enolate of ethyl 17-oxoalloyohimban-16β-glyoxylate was filtered and washed with dry ether. This salt gave a brown-red color with an alcoholic solution of ferric chloride. The salt was dissolved in 50 milliliters of 50% aqueous methanol and passed slowly over a column of Amberlite IRC–50 (H+) resin. After discarding the first 400 milliliters of eluate, the next 300 milliliters were collected and evaporated to yield ethyl 17-oxoalloyohimban-16β-glyoxylate as a brown amorphous powder, M.P. 196–199° dec. Recrystallization from boiling methanol produced a yellow microcrystalline powder, M.P. 207–209° dec.;

$\lambda_{max}^{methanol}$ 228 m$\mu$ ($\epsilon$33,000), 284 m$\mu$ ($\epsilon$12,100), 292 m$\mu$ ($\epsilon$11,900); $\lambda_{max}^{base}$ 227 m$\mu$ ($\epsilon$34,600), 284 m$\mu$ ($\epsilon$10,600), 291 m$\mu$ ($\epsilon$11,800), 314 m$\mu$ (13,400).

Alternately, the sodium salt was dissolved in water, filtered, and rapidly extracted with ethyl acetate. The aqueous phase was neutralized with dilute acetic acid and evaporated under reduced pressure, dissolved in 50% aqueous methanol and passed over an IRC–50 (H+) ion exchange resin, and the product isolated by evaporation and recrystallization.

Alternately, the sodium salt was dissolved in water, extracted with chloroform and the chloroform layer was extracted with water. The combined aqueous layers were adjusted to pH 5.1 with dilute hydrochloric acid and filtered. The filtrate was added to a saturated solution of picric acid in water and the yellow precipitate was removed by filtration. The resulting powder was purified by crystallization from alcohol-ether to yield yellow crystals of ethyl 17-oxo-alloyohimban-16β-glyoxylate picrate, M.P. 198–201° C. dec.

$\lambda_{max}^{methanol}$ 224 m$\mu$ ($\epsilon$32,700), 282 m$\mu$ ($\epsilon$9,100), 291 m$\mu$ ($\epsilon$8,960), 355 m$\mu$ ($\epsilon$8,100); $\lambda_{max}^{base}$ 283 m$\mu$ ($\epsilon$9,850), 290 m$\mu$ ($\epsilon$10,200), 318 m$\mu$ ($\epsilon$11,800).

*Example 9.—Preparation of 17-oxoalloyohimban-16β-carboxylic acid hydrochloride*

Alloyohimban-17-one (0.589 gram) was carboxylated with 8.0 milliliters of a 2.8 M solution of methyl magnesium carbonate in dimethylformamide as described in Example 1. The cooled reaction mixture was poured onto a chilled mixture of 4 milliliters of concentrated hydrochloric acid and 20 grams of ice. The separated solid was removed by filtration and washed with a small amount of water. Drying overnight over phosphorous pentoxide at room temperature and under reduced pressure afforded 0.718 gram of 17-axoalloyohimban-16β-carboxylic acid hydrochloride. The product possessed infrared bands at 5.82 and 6.02 microns.

We claim:

1. A compound selected from the group consisting of ring E substituted yohimbanes of the formula:

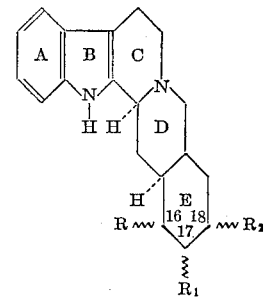

wherein R is selected from the group consisting of hydrogen, keto and lower alkoxyoxalyl, $R_1$ is selected from the group consisting of keto, carboxyl, lower alkoxycarbonyl and lower alkoxyoxalyl, and $R_2$ is selected from the group consisting of hydrogen, carboxyl, lower alkoxycarbonyl and lower alkoxyoxalyl, with the proviso that one substituent only is keto and one substituent only is hydrogen; and the non-toxic pharmaceutically acceptable metal enolates and acid addition salts thereof.

2. 17-oxoyohimban-18α-carboxylic acid.
3. Methyl 17-oxoyohimban-18α-carboxylate.
4. Ethyl 17-oxoyohimban-18α-glyoxylate.
5. Ethyl 16-oxoyohimban-17β-glyoxylate.
6. Ethyl 17-oxoalloyohimban-16β-glyoxylate.

References Cited by the Examiner

UNITED STATES PATENTS 2,789,113  4/1957  Taylor _____ 260—286
2,969,367  1/1961  Janot et al. _____ 260—287

FOREIGN PATENTS 1,199,432  12/59  France.

OTHER REFERENCES

Aksanova et al., Chem. Abstracts, vol. 52 (1958), page 7335 (abstracted from Doklady Akad. Nauk. S.S.S.R., vol. 117 (1957)), pages 81–83.

Campbell et al., Jour. Amer. Chem. Soc., vol. 64 (1942), pages 420 and 422.

Chatterjee et al., Die Naturwiss., vol. 41 (1954), pages 215 and 216.

WALTER A. MODANCE, *Primary Examiner.*

IRVIN G. MARCUS, DUVAL McCUTCHEN,
*Examiners.*